Figure 1:
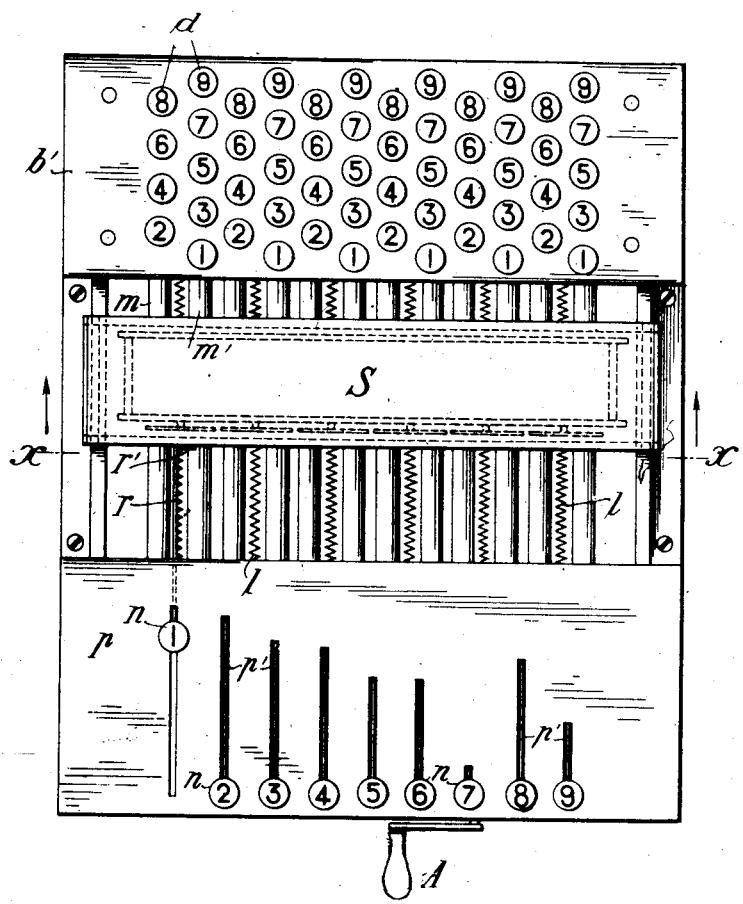

No. 867,061. PATENTED SEPT. 24, 1907.
E. LEDER.
CALCULATOR.
APPLICATION FILED MAR. 21, 1907.

6 SHEETS—SHEET 1.

Witnesses:
R. Fischer
H. Rensch.

Inventor:
Ernst Leder
By H.A. Kayy
Attorney

No. 867,061. PATENTED SEPT. 24, 1907.
E. LEDER.
CALCULATOR.
APPLICATION FILED MAR. 21, 1907.

6 SHEETS—SHEET 2.

Witnesses:
R. Fischer
M. Rensch

Inventor:
Ernst Leder
By
Attorney

No. 867,061.

PATENTED SEPT. 24, 1907.

E. LEDER.
CALCULATOR.
APPLICATION FILED MAR. 21, 1907.

6 SHEETS—SHEET 4.

Witnesses:
R. Fischer
M. Rensch

Inventor:
Ernst Leder
By: [signature]
Attorney

No. 867,061. PATENTED SEPT. 24, 1907.
E. LEDER.
CALCULATOR.
APPLICATION FILED MAR. 21, 1907.

6 SHEETS—SHEET 5.

Witnesses:
R. Fischer
U. Rensch

Inventor:
Ernst Leder
By R. A. Hoppen
Attorney

No. 867,061. PATENTED SEPT. 24, 1907.
E. LEDER.
CALCULATOR.
APPLICATION FILED MAR. 21, 1907.

6 SHEETS—SHEET 6.

Witnesses:
R. Fischer
A. Renich

Inventor:
Ernst Leder
By
Attorney

UNITED STATES PATENT OFFICE.

ERNST LEDER, OF RIXDORF, GERMANY.

CALCULATOR.

No. 867,061.　　　　Specification of Letters Patent.　　　　Patented Sept. 24, 1907.

Application filed March 21, 1907. Serial No. 363,778.

*To all whom it may concern:*

Be it known that I, ERNST LEDER, a citizen of the Empire of Germany, residing at Rixdorf, near Berlin, in the Empire of Germany, have invented a new and useful Calculator, of which the following is a specification.

My invention consists of a new or improved calculator or arithmetical machine which is capable of performing arithmetical operations, such as additions, subtractions, multiplications, divisions or other calculations.

The operation of this machine is most simple. It comprises a key board for one figure or quantity, a slide key board for another figure or quantity, a plurality of slides movable between the key board and the slide key board and each provided with a pair of rollers having various series of teeth on their peripheries, a carriage movable over the slides and containing an operameter adapted to be operated by the teeth of the rollers, a mechanism controlled from the key board for adjusting the several slides, and a hand-crank with a driving mechanism for adjusting the dials in the operameter. For performing an arithmetical operation, for example a multiplication, first the respective keys of the key board are depressed in accordance with the single figures of the multiplicand, whereby the corresponding slides are shifted and adjusted, then the slide key that corresponds to the unit of the multiplicator is pushed to the rear to shift and adjust the carriage, next a hand-crank is turned once so as to turn all the rollers in the slides the one after the other, whereby the operameter in the carriage is operated, so that the result, that is the product, will be shown in the windows of the carriage. Thereupon the carriage is automatically pulled to the front for returning the said slide key to its initial position, after which the slide key in accordance with the tens of the multiplicator is pushed to the rear to shift and adjust the carriage and the hand-crank is turned once more, when the whole product will appear in the windows. If the multiplicator has hundreds, thousands and so on, of course the carriage will be pulled repeatedly to the front for returning the shifted slide keys to their initial positions, after which the respective slide keys corresponding to the figures in the hundreds, thousands and so on of the multiplicator are one after the other pushed to the rear and the hand-crank is once turned each time, when at last the final product will appear in the windows of the carriage.

I will now proceed to describe my invention with reference to the accompanying drawings, in which—

Figure 2:
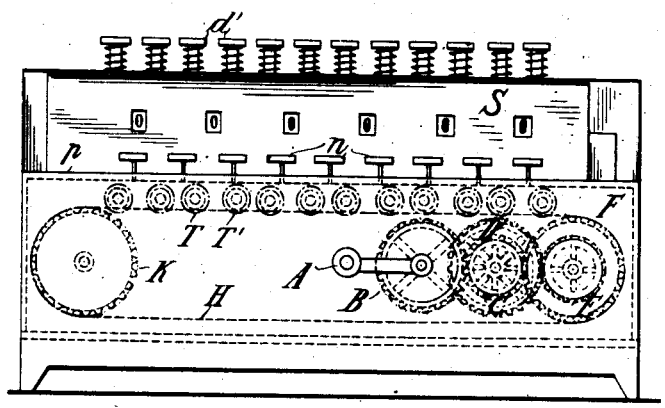
Figure 3:
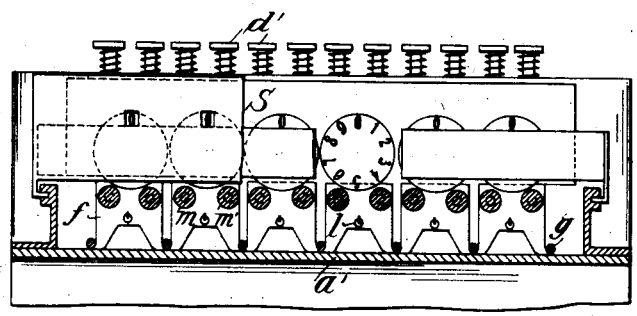
Figure 4:
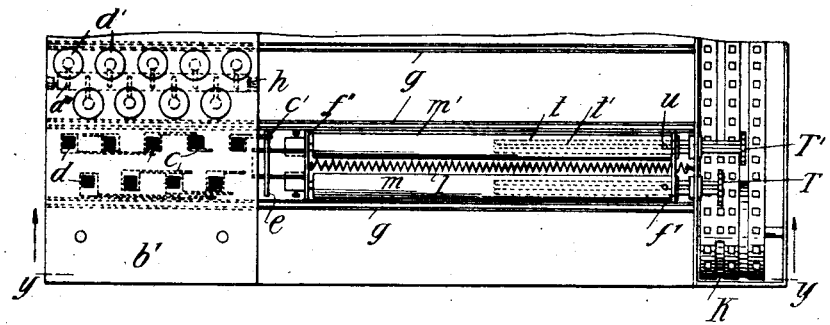
Figure 5:
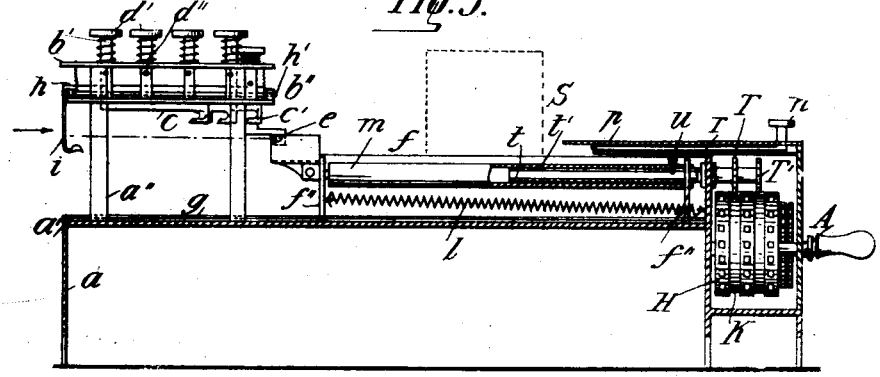
Figure 6:
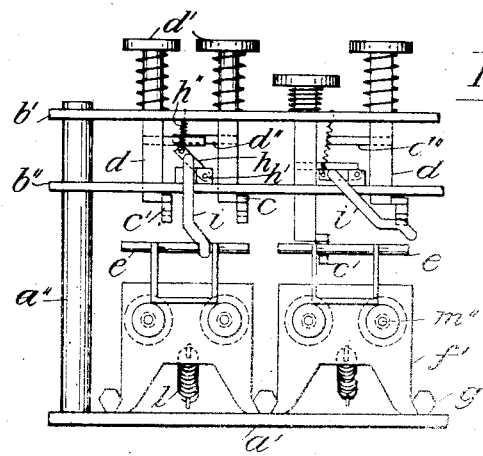
Figure 7:
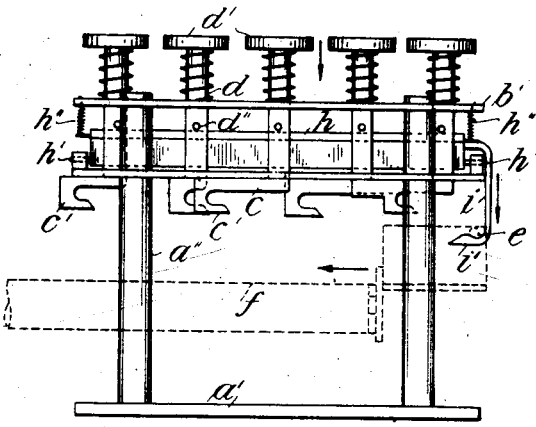
Figure 8:
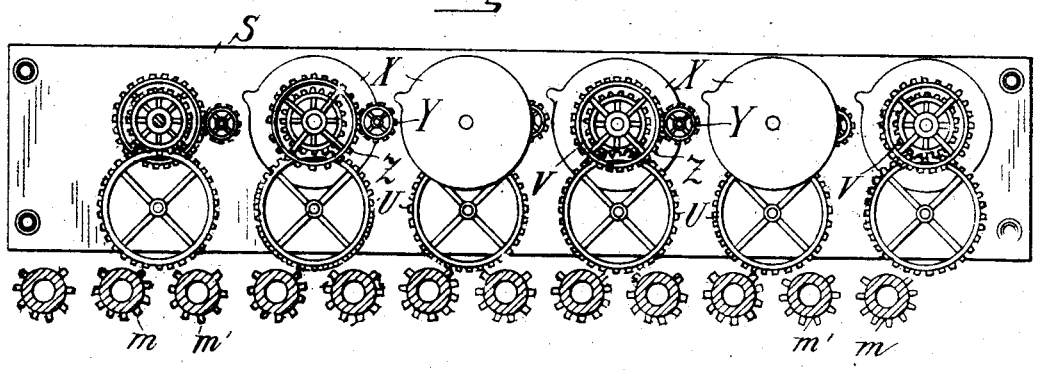
Figure 9:
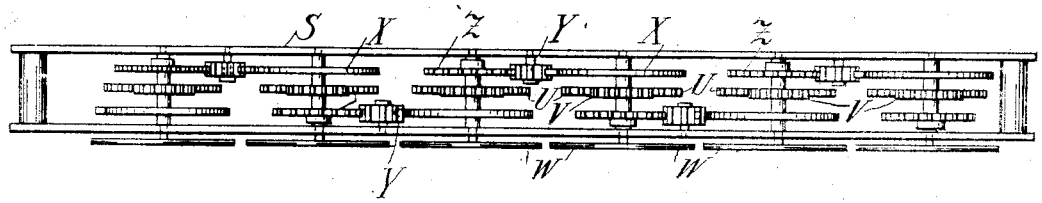
Figure 10:
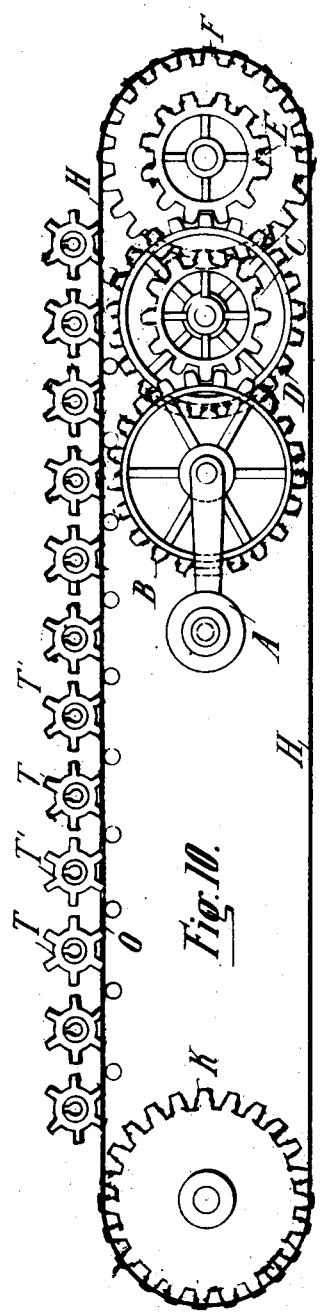
Figure 11:
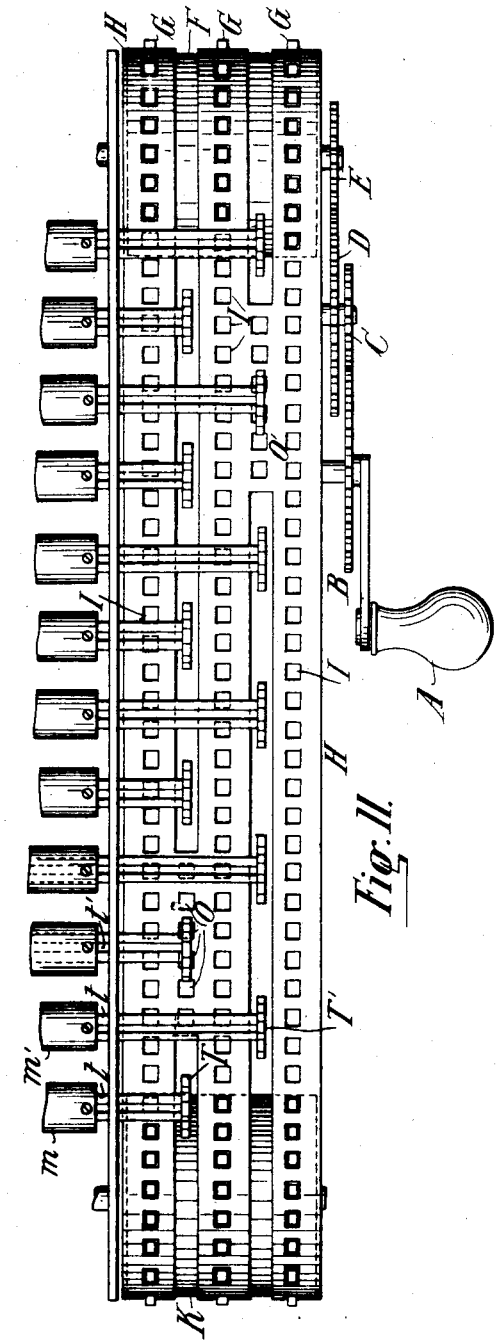
Figures 12, 13:
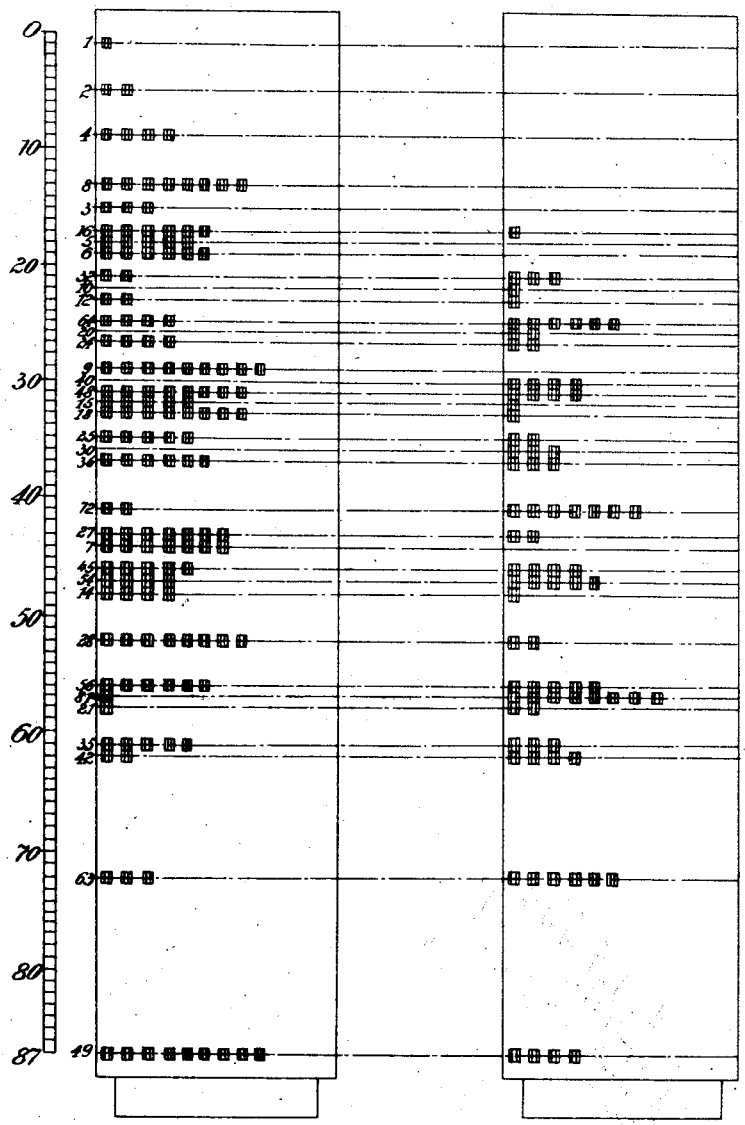

Figure 1 is a plan of the complete calculator, Fig. 2 is a front view of the same, Fig. 3 is a vertical cross section through the same on the line $x-x$ in Fig. 1 seen from the front in the direction of the arrows, Fig. 4 is a 
view of part of the calculator illustrated in Fig. 1, the top being turned to the left side and the key board on the left being shown partly in plan and partly in a horizontal section through the line $z-z$ in Fig. 5, and the slide key board on the right being omitted, Fig. 5 is a vertical section through the line $y-y$ in Fig. 4, Fig. 6 is a rear view on an enlarged scale of part of the calculator, seen in the direction of the arrow in Fig. 5, Fig. 7 is a side view of the same part seen from left to right in Fig. 6, Fig. 8 is an elevation on an enlarged scale of the operameter contained in the carriage and shows in section the several rollers coöperating with the gear wheels in the operameter, Fig. 9 is a plan of the operameter, Fig. 10 is a front view on an enlarged scale of the hand-crank and the driving mechanism for operating the endless band, Fig. 11 is a plan of the same, Fig. 12 is the development of one roller in either pair, and Fig. 13 is the development of the other roller in the same pair.

Similar characters of reference refer to similar parts throughout the several views.

The calculator shown comprises a box $a$ (see Fig. 5), on which two side rails 1, 1 (see Fig. 3) and several (here seven) parallel rails $g$ $g$ of hexagonal section are fastened. Several (here six) parallel slides $f$ $f$ are mounted to move on the top of the box $a$ while they are guided by the rails $g$ $g$. The slides $ff$ are shown as each consisting of two end plates $f'$ and $f''$ (see Fig. 5), which are rigidly connected with one another by suitable stays not shown. The box $a$ is shown as containing a special compartment 2, to the rear wall of which the several slides $ff$ are elastically attached by means of helical springs $l$ $l$, so that they are constantly pressed to the front. The rear end plate $f''$ of each slide $f$ (see Fig. 6) is provided with two holes for the rear pivots $m''$ of two rollers $m$ and $m'$. The latter are hollow and are made to slide on two shafts $t$ $t$ which are mounted to turn in the rear wall of the compartment 2. The rollers $m$ and $m'$ are prevented from turning on the shafts $t$ $t$ by means of screws $u$ engaging in longitudinal grooves of the latter. In the compartment 2 two parallel drums K and F (Fig. 10 and 11) are mounted to turn, which are connected with each other by means of an endless band H placed over them and provided with three parallel rows of square holes, in which corresponding teeth G G on the two drums K and F engage. The endless band H is divided by two parallel long slots into three sections, which are connected with one another by two short pieces provided with several square holes O and O′ respectively, these holes being on two different places of the band halving the length of the latter. The front ends of the above mentioned shafts $t$ $t$ are provided with gear wheels T and T′ which can periodically and one after the other engage in the two series of holes O and O' respectively. Guiding rollers 3, 3 are provided for supporting the upper branch of the endless band H and thus assuring the proper meshing of the gear wheels T and T' with the endless band H. Fastened on the front end of the shaft of the right drum F is a gear wheel E, which meshes with a larger gear wheel D. The latter is by its shaft rigidly connected with a smaller gear wheel C, that engages a larger gear wheel B fastened on the shaft of a hand-crank A. The ratio of the gear wheels B, C, D and E is so proportioned, that for every complete revolution of the hand-crank A the endless band H will make one complete turn round the two drums K and F, so that after each revolution of the hand-crank A a certain point on the band H will return to its initial position. The rollers $m$ and $m'$ in the several slides $ff$ have on their peripheries a plurality of teeth, which are disposed in varying orders in parallel planes, as is illustrated in Figs. 12 and 13, which show the developments of the two rollers. These teeth will be referred to later on.

On the rear end of the box $a$ (Fig. 5) is disposed the key board (see Fig. 1), which comprises two superposed horizontal plates $b'$ and $b''$ and a plurality of keys $d'$. The two plates $b'$ and $b''$ are supported by four studs $a''$ on the box $a$ and serve for guiding the vertical square shafts $d$ of the keys $d'$, which are arranged in the vertical planes of the several rollers $m$ and $m'$. The keys $d'$ in the vertical plane of each roller $m$ carry the even numbers 2, 4, 6 and 8 and those in the vertical plane of each roller $m'$ the odd numbers 1, 3, 5, 7 and 9. The keys $d'$ are pressed upwards by helical springs shown in Fig. 7 as usual. The lower ends of their shafts $d$ carry cranked arms $c$ of varying lengths, which are provided with downwardly projecting hooks $c'$, as is clearly shown in Figs. 6 and 7. Between the two plates $b'$ and $b''$ the shafts $d$ are each provided with an arm $d''$ which is adapted to depress a rocking plate $h$. The latter is placed parallel to the slide $f$ and has at its ends two pivots $h'$, which engage in suitable bearings on the lower plate $b''$. Each rocking plate $h$ is pressed upwards against the arms $d''$ of the two parallel rows of key shafts $d$ by means of two helical springs $h''$, so that normally it is placed at an angle of about 45° to the horizontal plate $b''$, as is shown on the left in Fig. 6. Each rocking plate has on its rear end a downwardly projecting arm $i$ with a hook $i'$. Each slide $f$ has on its rear end plate $f''$ a projection $f'''$ of any suitable shape, on which a horizontal cross rod $e$ is fastened. In the initial position of the slides the cross rods $e$ of the slides $f$ will snap under the hooks $i'$ of the arms $i$ respectively, so that the slides $f$ will be thereby locked and prevented from shifting on the carriage being moved to the front. When either key $d'$ is depressed, see Fig. 6, the arm $d''$ of its shaft $d$ will depress the rocking plate $h$, so that the arm $i$ of the latter will be turned upwards and its hook $i'$ will release the slide $f$, whereupon the helical spring $l$ will pull the slide $f$ to the front. Now, however, that the hook $c'$ on the arm $c$ of this key $d'$ engages in the path of the cross rod $e$, of course this hook $c'$ will catch the cross rod $e$ and prevent the slide $f$ from moving further (see Fig. 5). The several arms $c$ of the keys $d'$ are made of different lengths, as already mentioned above, so that their hooks $c'$ will severally stop the corresponding slides $f$ on different points of their paths. The keys $d'$ in the extreme pair of rows on the right in Fig. 1 correspond to the units of the multiplicand. The keys $d'$ in the next following pair of rows, when counting from right to left, correspond to the tens of the multiplicand, and those in the third pair of rows to the hundreds, those in the fourth pair of rows to the thousands of the multiplicand, and so on. It is evident, that when a key $d'$ has been depressed and its hook $c'$ has caught the cross rod $e$ of the slide $f$, the key $d'$ will be prevented from returning to its upper position on being released by one's finger.

On the front over the compartment 2 is disposed the slide key board, which comprises a horizontal plate $p$ and nine keys $n$ with the numbers 1, 2, 3, 4, 5, 6, 7, 8 and 9. The plate $p$ is provided with nine parallel slots $p'$ of different lengths and with guides beneath these slots for slides $r$, which are rigidly connected with the keys $n$ and are provided with bent ends $r'$ (see Fig. 1.) The bent ends $r'$ are adapted to severally bear against the carriage S, so that by means of their slides $r$ the keys $n$ are adapted to severally push the carriage S to the rear through a distance corresponding to the length of the respective slot $p'$.

Within the carriage S an operameter shown at Figs. 8 and 9 is disposed, which may in any known manner be arranged to be longitudinally shifted through a small distance. The operameter comprises two vertical plates S' S' with four stays S'' S'', a series of gear wheels U and above them a series of parallel and horizontal shafts 4, 4 with gear wheels and dials. As already mentioned above, the several rollers $m$ and $m'$ have on their peripheries several rows of teeth in parallel planes, as is shown at Figs. 12 and 13. The number of teeth in the several rows varies. About one fourth of the periphery of each roller $m$ or $m'$ is left without teeth and these large space (see Fig. 8) are normally at the top, so that all the large gear wheels U remain out of engagement with the rollers $m$ and $m'$ below. Only during the rotation of either roller $m$ or $m'$ those of its teeth, which are in the plane of the gear wheel U, can engage in the teeth of the latter for turning it through a certain angle. Owing to the arrangement shown of the holes O and O' in the band H the two rollers $m$ and $m'$ in each slide $f$ are turned one after the other, so that they do not disturb each other in turning the corresponding gear wheel U. Each gear wheel U meshes with a smaller gear wheel V, which has ten teeth and is by its shaft 4 rigidly connected with a dial W without and a disk X within, which latter has a single tooth 5. On the several shafts 4,4 are disposed like gear wheels V and Z and like disks W. Each dial W carries the numbers 0, 1, 2, 3, 4, 5, 6, 7, 8 and 9, either of which can appear in a window 6 in the carriage S, see Figs. 2 and 3. The tooth 5 of the extreme disk X on the right in Figs. 8 and 9 can engage in an intermediate gear wheel Y only once for every rotation of the shaft 4, so as to thereby turn the following gear wheel Z one tooth forward. As each gear wheel Z has ten teeth, it follows, that after every rotation of either dial W the following dial W on the left will be turned one number forward, as usual. From this arrangement it follows, that after ten revolutions of the first dial W on the right in Fig. 9 the second dial W will be turned one number forward, that after one hundred revolutions of the first dial W the second dial W will have made one complete revolution, while the third dial W will have been turned one number forward, and so on. This transmission of motion from the first dial W on the right to the following dials W is well known and does not form a part of this invention. I also do not show or describe any device for returning all the dials W into their initial positions, in which they show all their zeroes, as this device forms no part of my invention and may be of any known construction.

All the rollers $m$ and $m'$ have the same diameter and length, and the rollers $m$ in the several pairs are made perfectly alike and different from the other rollers $m'$, which in turn are made perfectly alike. With regard to the arrangement of the teeth on the peripheries of the several rollers, each roller may be assumed to have 87 division circles in parallel planes at like distance from each other according to the scale on the left in Fig. 12. On some of these division circles are placed teeth of varying numbers, while on other division circles no teeth at all are placed, as is shown. The numbers of the teeth in the several division circles are arranged in a certain order and correspond to from 1 to 9 and to the products obtained by the multiplication of any two of the former figures, the product being expressed by units and tens.

On the 1st division circle of the roller $m$ 1 tooth is disposed, see Fig. 12, on the 5th division circle are disposed 2 teeth, on the 15th division circle 3 teeth, on the 44th division circle 7 teeth. In this manner the remaining numbers of teeth are disposed.

As an example the places for the teeth for the number 15 may be ascertained. 15 is like 3 times 5. According to the above explanation the teeth for the number 3 are disposed on the 15th division circle of the roller $m$ and are therefore at a distance of 14 pitches from the 1st division circle; and the teeth for the number 5 are disposed on the 18th division circle, that is at a distance of 17 pitches from the 1st division circle. The teeth for the product of $3 \times 5 = 15$ are disposed on the division circle at a distance like the sum of the said two distances, that is $14+17=31$ pitches from the 1st division circle, therefore on the 32nd division circle. One of the said two distances is to be determined by the arm $c$ of the respective key $d'$ and the other distance by the stroke of the respective slide key $n$.

After the above explanations the matter may be expressed in general terms as follows: If the teeth for a number $x$ be on the $a$th division circles of the two rollers $m$ and $m'$, those for a second number $y$ be on the $b$th division circles, then the teeth for the product $x y$ will be on the $(a-1)+(d-1)+1=(a+b-1)$th division circles of the two rollers $m$ and $m'$. Thus if the teeth for the number 7 are on the 44th division circle of the one roller $m$ as mentioned above and the teeth for 3 on the 15th division circle of the roller $m$, then the above formula will furnish the place of the teeth for the product $7 \times 3 = 21$ as the $44+15-1=58$th division circle of the two rollers $m$ and $m'$, and this is actually the case, as Fig. 12 will prove, 1 tooth being on the roller $m$ and 2 teeth on the roller $m'$.

The following table calculated from the above formula will show the number of pitches for the distance from the 1st division circles of those division circles of the two rollers $m$ and $m'$, on which the teeth for the product from 2 values, each ranging between 1 and 9, will be found. The crossing point of either vertical column for the multiplicand with either horizontal column for the multiplicator will show the number of pitches for the distance from the first division circles of those division circles on which the teeth for the product will be found.

|   | 1 | 2 | 3 | 4 | 5 | 6 | 7 | 8 | 9 |
|---|---|---|---|---|---|---|---|---|---|
| 1 | 1 | 5 | 15 | 9 | 18 | 19 | 44 | 13 | 29 |
| 2 | 5 | 9 | 19 | 13 | 22 | 23 | 48 | 17 | 33 |
| 3 | 15 | 19 | 29 | ?? | 32 | 33 | 58 | 27 | 43 |
| 4 | 9 | 13 | 23 | 17 | 26 | 27 | 52 | 21 | 37 |
| 5 | 18 | 22 | 32 | 26 | 35 | 36 | 61 | 30 | 46 |
| 6 | 19 | 23 | 33 | 27 | 36 | 37 | 62 | 31 | 47 |
| 7 | 44 | 48 | 58 | 52 | 61 | 62 | 87 | 56 | 72 |
| 8 | 13 | 17 | 27 | 21 | 30 | 31 | 56 | 25 | 41 |
| 9 | 29 | 33 | 43 | 37 | 46 | 47 | 72 | 41 | 57 |

For ascertaining the division circles, on which the teeth for the number 63 are disposed, this number may be regarded as the product of $7 \times 9$, therefore the crossing point of either the 7th vertical column with the 9th horizontal line or the 9th vertical column with 7th horizontal line will give 72 as the numeral of the division circles on which the teeth for 63 are disposed, that is to say 3 teeth on the unit roller $m$ and 6 teeth on the tens roller $m'$, which is actually the case, see Fig. 12 and 13.

From the above formula and table the following distances of the respective division circles from the first division circles are determined:

1 pitch for the number 1
5 pitches " " " 2
15 " " " " 3
9 " " " " 4
18 " " " " 5
19 " " " " 6
44 " " " " 7
13 " " " " 8
29 " " " " 9

In accordance with these distances the lengths of the arms $c$ of the keys $d'$ and those of the slots $p'$ for the slide keys $n$ are proportioned. That is to say the slide $f$ is to be stopped on such a point of its stroke by depressing the key $d'$, that when the carriage S occupies the right position, its respective gear wheels U and V will be in the same vertical plane as the corresponding division circles on the two rollers $m$ and $m'$; and further if the carriage S is pushed to the rear by either slide key $n$, it will occupy such a position in which its gear wheels U and V will be in the same vertical plane as the corresponding division circles on the two rollers $m$ and $m'$, their distance from the first division circles being like the sum of the two distances to be found in the above table.

When the scale for the teeth in Figs. 12 and 13 is examined with a pair of compasses, it will be found, that the sum of the distances for any two numbers from the first division line will give the distance for the product. For example take the vertical distance between the horizontal division lines for 1 and 4 with the compasses and put one point of same in 2, then the other point will fit in the division point for 8(4×2=8), or put one point of the compasses in 9, when the other point will fit in the division point for 36(4×9=36) and so on.

From the above it will be seen, that each slide $f$ can be brought into nine different positions by depressing the corresponding keys $d'$ which carry the numbers 1, 2, 3, 4, 5, 6, 7, 8 and 9. When depressing the key with the number 1 in the first pair of rows on the right in Fig. 1, also the key with the number 2 in the second pair of rows (when counting from right to left), the key with the number 3 in the third pair of rows, the key with the number 4 in the fourth pair of rows, and the key with the number 5 in the fifth pair of rows, of course the first five slides $ff$ will be pulled to the front through varying distances according to the scale shown in Fig. 12. After the above explanations it will be obvious, that when the carriage S is pushed to the rear by means of the slide key $n$ carrying the number 1, there will be in the vertical plane of its gear wheels U and V 1 tooth on the roller $m$ in the first slide $f$, 2 teeth on the roller $m$ in the second slide $f$, 3 teeth on the roller $m$ in the third slide $f$, 4 teeth on the roller $m$ in the fourth slide $f$, and 5 teeth on the roller $m$ in the fifth slide $f$. If further the carriage S is pulled to the front for returning the slide key $n$ with the number 1 to its initial position and afterwards it is pushed to the rear by means of the slide key $n$ carrying the number 2, of course there will be in the vertical plane of its gear wheels U and V 2 teeth on the roller $m$ in the first slide $f$ corresponding to the product of 1×2=2, 4 teeth on the roller $m$ in the second slide $f$ corresponding to the product of 2×2=4, 6 teeth on the roller $m$ in the third slide $f$ corresponding to the product of 3×2=6, 8 teeth on the roller $m$ in the fourth slide $f$ corresponding to the product of 4×2=8, and the teeth for the product of 5×2=10 that is to say 1 tooth on the roller $m'$ in the fifth slide $f$. It will be now clear, that after the hand-crank A has been once turned, thereby the several rollers $m$ and $m'$ carrying teeth in the plane of the gear wheels U and V will have turned the gear wheels V as many teeth forward as there are teeth on them, so that the first dial W will show the number 2 in its window, the second dial W the number 4, the third dial W the number 6, the fourth dial W the number 8, the fifth dial W the number 0 and the sixth dial W the number 1. Then the whole number shown in the several windows will be 108642, which is the product of 54321×2.

For multiplying say 4321 by a multiplicator larger than a unit, say 72, it is to be remembered, that according to the well known formula $(a+b) c = a.c + b.c$ the product of 4321×72 will be equal to 4321×70=302470
4321× 2= 8642
───────
311112

From this it will be seen, that these two sums require to be added up for obtaining the total product. For this reason after the first multiplication the operameter requires to be shifted to the right through one tooth pitch of the gear wheels U, so as to prevent the teeth on the rollers $m$ and $m'$ from engaging in the wrong teeth of the gear wheel U, when the second multiplication is effected. Therefore the operameter is provided with a device, by means of which it is automatically shifted in one direction when turning the hand-crank A and in the other direction before the completion of the revolution. I do not show or describe this device, as it is immaterial to my invention and may be of any known construction.

The calculator is operated as follows: If for example 365 is to be multiplied by 175, then depress in the direction from right to left in Fig. 1 the keys $d$ carrying the numbers 5 in the first pair of rows for units, 6 in the second pair of rows for tens and 3 in the third pair of rows for hundreds when the first three slides $f$ will be pulled to the front and stopped at varying points of their paths, afterwards push the slide key $n$ carrying the number 5 to the rear and thereby also the carriage S; thereupon turn the hand-crank A once, so that all the rollers $m$ and $m'$ will all make one complete rotation one after the other, but only the teeth on the first three pairs of rollers $m$ and $m'$, which are in the vertical plane of the gear wheels U and V will engage the same for turning their dials W W through certain angles. At this moment in the first four windows 6, 6 of the carriage S the number 1825 will appear as the product of 365×5. Then the carriage S is automatically pulled to the front for returning the slide key $n$ with the number 5 to its initial position and afterward it is again pushed to the rear by means of the slide key $n$ carrying the number 7, next the hand-crank A is once turned, when first the operameter will be automatically shifted in the longitudinal direction by one figure to the right as explained above, so that in the several windows there will appear the number 27375 as the sum of the two product (365×70)+1825=25550+1825.

Thereupon the carriage S is pulled to the front for returning the slide key $n$ with the number 7, and next it is again pushed to the rear by means of the slide key $n$ carrying the number 1, and at last the hand-crank A is once turned, when in the windows of the carriage S there will appear the number 63875 as the sum of the products (365×100)+27375=36500+27375.)

The calculator may be varied in many respects without departing from the spirit of my invention.

I claim:

1. In a calculator, the combination with a frame, of a key board, a slide key board, slides movable in said frame between said key board and said slide key board and each provided with a pair of rollers having various series of teeth on their peripheries, a carriage movable in said frame over said slides and containing an operameter adapted to be operated by the teeth of said rollers, a mechanism controlled from said key board for shifting and adjusting the several slides, a mechanism controlled from said slide key board for shifting and adjusting said carriage, and a hand-crank with a driving mechanism for once turning all the rollers one after the other for every arithmetical operation and thereby actuating the dials in the operameter.

2. In a calculator, the combination with a frame, of a key board at one end of said frame, a slide key board at the opposite end of said frame, slides guided in said frame beneath said key board and said slide key board and each provided with a pair of rollers having various series of teeth on their peripheries, a carriage movable in said frame over said slides and containing an operameter adapted to be operated by the teeth of said rollers, a mechanism controlled from said key board for shifting and adjusting the several slides, a mechanism controlled from said slide key board for shifting and adjusting said carriage, and a hand-crank with a driving mechanism for once turning all the rollers one after the other for every arithmetical operation and thereby actuating the dials in the operameter.

3. In a calculator, the combination with a frame, of a key board at one end of said frame, a slide key board at the opposite end of said frame, slides parallelly guided in said frame beneath said key board and said slide key board at right angles thereto and each comprising two parallel rollers, the first pair of rollers in the whole series being for units, the second for tens, the third for hundreds, the fourth for thousands and so on, means pulling said slides to said slide key board, a carriage guided in said frame between said key board and said slide key board at right angles thereto, spring-pressed rockers in said key board parallel to said slides and adapted to catch and to lock same when pushed and to release same on being depressed, said key board comprising spring-pressed keys in double rows along said spring-pressed rockers and adapted to depress same for releasing the corresponding slides and to stop the latter on various points of their strokes, said slide key board comprising slide keys guided in parallel slots of varying length and adapted to push said carriage, an operameter in said carriage with a series of operating gear wheels in a common longitudinal plane, the rollers in said slides being provided on their peripheries with varying numbers of teeth in various parallel cross planes which teeth are adapted to engage in the operating gear wheels of said operameter, and means for once rotating all the rollers in said slides one after the other for every arithmetical operation, whereby the dials in said operameter are actuated.

4. In a calculator, the combination with a frame, of a key board at one end of said frame, a slide key board at the opposite end of said frame, slides parallelly guided in said frame beneath said key board and said slide key board at right angles thereto and provided with cross rods and each comprising two parallel rollers, the first pair of rollers in the whole series being for units, the second for tens, the third for hundreds, the fourth for thousands and so on, means pulling said slides to said slide key board, a carriage guided in said frame between said key board and said slide key board at right angles thereto, spring-pressed rockers in said key board parallel to said slides and provided with hooked arms adapted to catch and to hold the cross rods of said slides when pushed and to release same on being actuated, said key board comprising spring-pressed keys in double rows along said spring-pressed rockers and adapted to depress same, hooked arms of varying length at the keys and adapted to catch the cross rods of said slides when released for stopping the latter on various points of their strokes, said slide key board comprising slide keys guided in parallel slots of varying length and adapted to push said carriage, an operameter in said carriage with a series of operating gear wheels in a common longitudinal plane, the rollers in said slides being provided on their peripheries with varying numbers of teeth in various parallel cross planes which teeth are adapted to engage in the operating gear wheels of said operameter, and means for once turning all the rollers in said slides one after the other for every arithmetical operation, whereby the dials in said operameter are actuated.

5. In a calculator, the combination with a frame, of a key board at one end of said frame, a slide key board at the opposite end of said frame, slides parallelly guided in said frame beneath said key board and said slide key board at right angles thereto and each comprising two parallel rollers, the first pair of rollers in the whole series being for units, the second for tens, the third for hundreds, the fourth for thousands and so on, means pulling said slides to said slide key board, a carriage guided in said frame between said key board and said slide key board at right angles thereto, a mechanism controlled from said key board for catching and holding said slides when pushed and for releasing and stopping same on various points of their strokes on the keys being depressed, said slide key board comprising slide keys guided in parallel slots of varying length and adapted to push said carriage, an operameter in said carriage with a series of operating gear wheels in a common longitudinal plane, the rollers in said slides being provided on their peripheries with varying numbers of teeth in various parallel cross planes which teeth are adapted to engage in the operating gear wheels of said operameter, parallel shafts mounted in said frame to turn and adapted to engage in the rollers in said slides, gear wheels fastened on the ends of said parallel shafts and disposed in two parallel rows, the gear wheels of the one row adapted to each control one roller in each slide and the gear wheels of the other row adapted to each control the other roller in each slide, two drums with teeth parallel to said slides and mounted in said frame to turn, an endless band placed over said two drums and provided with perforations working with their teeth and adapted to once rotate all of said gear wheels one after the other during one complete turn, a hand-crank, and a gearing adapted to move said endless band once round for every revolution of said hand-crank.

6. In a calculating-machine, the combination with a frame, of a key board, a slide key board, slides movable in said frame between said key board and said slide key board and each provided with a pair of parallel rollers with teeth on their peripheries, a carriage movable in said frame over said slides and containing an operameter adapted to be operated by the teeth of said rollers, a mechanism controlled from said key board for shifting and adjusting the several slides, a mechanism controlled from said slide key board for shifting and adjusting said carriage, and a hand-crank with a driving mechanism for once turning all the rollers one after the other for every multiplication and thereby adjusting the dials in the operameter, the two rollers in each slide having their teeth arranged in parallel cross planes and the number to be represented in each cross plane being one of the numbers 1, 2, 3, 4, 5, 6, 7, 8 and 9 or the product of any two of them, the units of the products and the single numbers being on one roller and the tens of the products on the other roller.

7. In a calculating-machine, the combination with a frame, of a key board at one end of said frame, a slide key board at the opposite end of said frame, slides guided in said frame beneath said key board and said slide key board and each provided with a pair of parallel rollers having teeth on their peripheries, a carriage movable in said frame over said slides and containing an operameter adapted to be operated by the teeth of said rollers, a mechanism controlled from said key board for shifting and adjusting the several slides, a mechanism controlled from said slide key board for shifting and adjusting said carriage, and a hand-crank with a driving mechanism for once turning all the rollers one after the other for every multiplication and thereby actuating the dials in the operameter, the two rollers in each slide having their teeth arranged in parallel cross planes and the number to be represented in each cross plane being one of the numbers 1, 2, 3, 4, 5, 6, 7, 8 and 9 or the product of any two of them, the units of the products and the single numbers being on one roller and the tens of the products on the other roller.

8. In a calculating-machine, the combination with a frame, of a key board at one end of said frame, a slide key board at the opposite end of said frame, slides parallely guided in said frame beneath said key board and said slide key board at right angles thereto and each comprising two parallel rollers with teeth on their peripheries, a carriage guided in said frame between said key board and said slide key board at right angles thereto, a mechanism controlled from said key board for shifting and adjusting the several slides, a mechanism controlled from said slide key board for shifting and adjusting said carriage, an operameter in said carriage with a series of operating gear wheels in a common longitudinal plane and adapted to be operated by the teeth of the rollers in said slides, and a hand-crank with a driving mechanism for once turning all the rollers one after the other for every multiplication and thereby actuating the dials in said operameter, the two rollers in each slide having their teeth arranged in parallel cross planes and the numbers 1, 2, 3, 4, 5, 6, 7, 8 and 9 or the product of any two of them, the units of the products and the single numbers being on one roller and the tens of the products on the other roller, whereby the teeth are arranged in such a manner that every number 1, 2, 3, 4, 5, 6, 7, 8 and 9 and every product that can be obtained by multiplication of two such single numbers appears only once on the peripheries of the rollers.

In witness whereof I have hereunto set my hand in presence of two witnesses.

ERNST LEDER.

Witnesses:
 HENRY HASPER,
 WOLDEMAR HAUPT.